United States Patent
Kalaboukis et al.

(10) Patent No.: US 11,282,119 B1
(45) Date of Patent: Mar. 22, 2022

(54) SYSTEM, COMPUTER-READABLE STORAGE MEDIA, AND METHOD FOR COLLABORATIVE FINANCIAL TRANSACTIONS TO INCREASE CONSUMER BUYING POWER

(71) Applicant: Wells Fargo Bank, N.A., San Francisco, CA (US)

(72) Inventors: Chris Kalaboukis, San Jose, CA (US); Machu J. Latorre, Alameda, CA (US); Marria Rhodriquez, San Francisco, CA (US); Tleytmas N. Stephenson, Oakland, CA (US); Evelyn Ujanen, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 562 days.

(21) Appl. No.: 15/462,012

(22) Filed: Mar. 17, 2017

(51) Int. Cl.
*G06Q 30/06* (2012.01)

(52) U.S. Cl.
CPC ..... *G06Q 30/0605* (2013.01); *G06Q 30/0637* (2013.01)

(58) Field of Classification Search
CPC .................................. G06Q 30/0605
USPC ....................................... 705/26.2
See application file for complete search history.

(56) References Cited

U.S. PATENT DOCUMENTS

| | | | |
|---|---|---|---|
| 8,725,826 B2 | 5/2014 | Robinson et al. | |
| 2003/0204474 A1* | 10/2003 | Capek | G06Q 20/382 705/64 |
| 2006/0047583 A1* | 3/2006 | Jacobs | G06Q 30/06 705/26.2 |
| 2008/0250025 A1* | 10/2008 | Abhyanker | H04L 67/306 |
| 2011/0307397 A1 | 12/2011 | Benmbarek | |
| 2012/0030193 A1 | 2/2012 | Richberg et al. | |
| 2012/0239467 A1 | 9/2012 | Winters et al. | |

(Continued)

OTHER PUBLICATIONS

Jiang, Xuan; Deng, Shiming. Optimal Strategy for selling on Group-buying Website. 2014. Journal of Industrial Engineering and Management 7.4: 769-784. (Year: 2014).*

(Continued)

*Primary Examiner* — Brittney N Miller
(74) *Attorney, Agent, or Firm* — Foley & Lardner LLP

(57) ABSTRACT

A computer-implemented method for collaboratively purchasing an item. The method includes receiving a collaborative purchase request from a user at a collaborative purchasing computing system. The collaborative purchase request includes at least one of a purchase type, a purchase item, and a purchase goal. The method includes analyzing the collaborative purchase request to identify other users associated with the collaborative purchasing computing system that have indicated a desire to participate in a collaborative purchase request similar to the received collaborative purchase request. The method includes transmitting a collaborative purchase offer to the identified users. The method further includes receiving one or more collaborative purchase offer acceptances from one or more of the identified users, and providing details required to complete the collaborative purchase request to the user and the one or more identified users that accepted the collaborative purchase offer.

17 Claims, 6 Drawing Sheets

(56) References Cited

U.S. PATENT DOCUMENTS

| | | | |
|---|---|---|---|
| 2013/0018751 A1* | 1/2013 | Winslade | G06Q 30/02 |
| | | | 705/26.2 |
| 2013/0046702 A1 | 2/2013 | Ross et al. | |
| 2013/0179438 A1 | 7/2013 | Coldicott et al. | |
| 2014/0067634 A1 | 3/2014 | Sowder et al. | |
| 2014/0164199 A1 | 6/2014 | Wilkes | |
| 2014/0358713 A1* | 12/2014 | Prakash | G06Q 30/08 |
| | | | 705/26.3 |

OTHER PUBLICATIONS

Liu, Yi; Sutanto, Juliana. Buyers' purchasing time and herd behavior on deal-of-the-day group-buying websites. Jun. 2012. Electronic Markets 22.2: 83-93. (Year: 2012).*

Yang et al., "Like like alike—Joint Friendship and Interest Propagation in Social Networks", WWW 2011, Mar. 28-Apr. 1, 2011, Hyderabad, India. 10 pages.

* cited by examiner

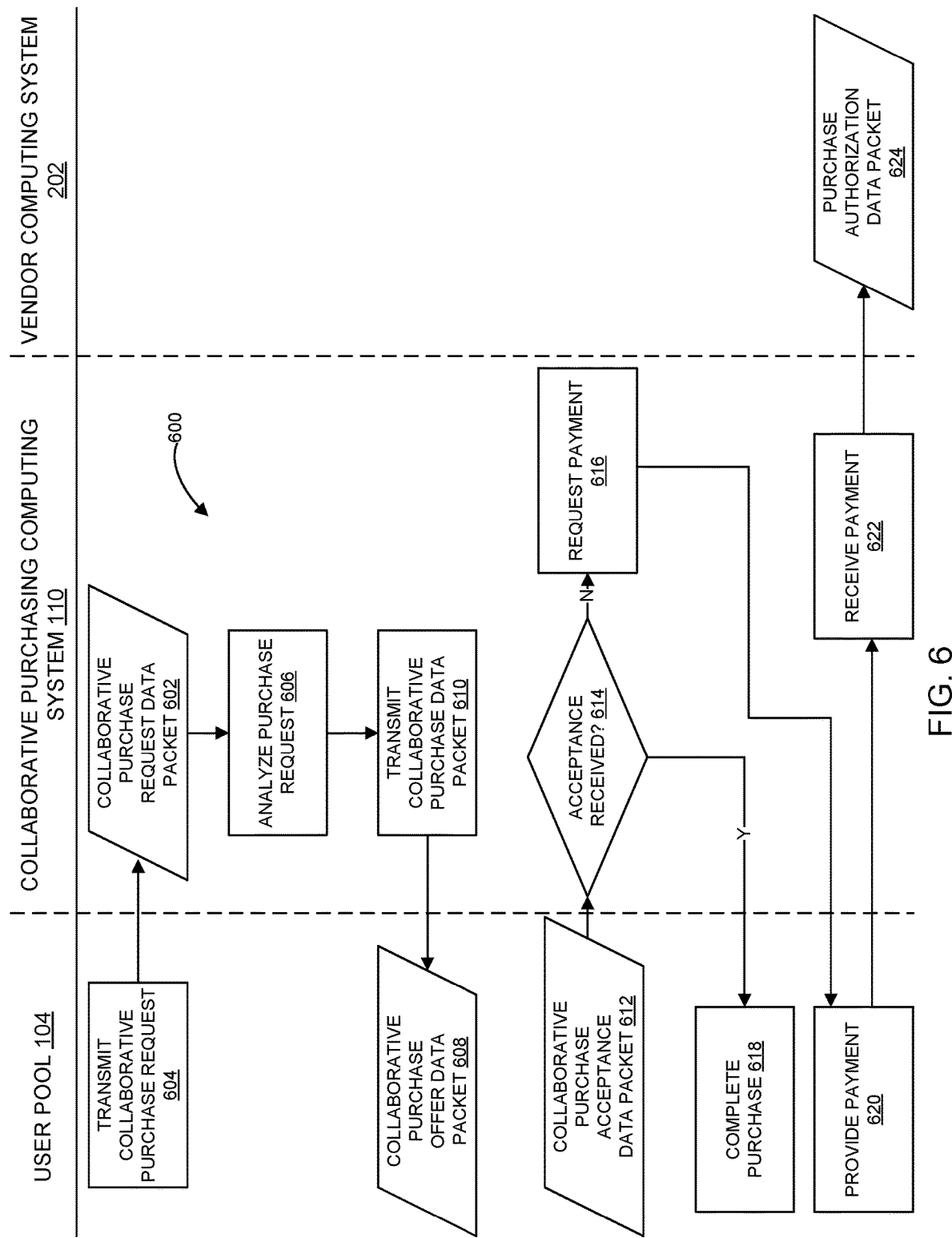

SYSTEM, COMPUTER-READABLE STORAGE MEDIA, AND METHOD FOR COLLABORATIVE FINANCIAL TRANSACTIONS TO INCREASE CONSUMER BUYING POWER

BACKGROUND

The sharing economy has highlighted the ability for consumers to work directly with each other to procure certain goods and services. However, for some activities, such as large purchases (e.g. a car), it can be difficult to leverage the sharing economy to obtain group pricing. For example, when a person currently shops for a vehicle the person goes to a number of dealerships to shop around in order to obtain the lowest price. However, this can only get a consumer so far, as the amount of leverage the consumer has is small compared to that of the dealerships. In other examples, a consumer may wish to save money by purchasing items in bulk. However, purchasing perishable items, such as produce and meat in bulk, may be difficult to justify for persons who will not be able to consume all of the product before it expires. Under such circumstances, the consumer may forgo the cost savings associated with purchasing bulk items, or risk wasting a portion of the goods due to spoilage. Collaboration between consumers could allow for consumers to leverage economies of scale to reduce the prices on large purchases, as well as to share in a purchase of a bulk item, thereby reducing the cost to the individual consumers participating in the transaction, as well as reducing waste generated by unused and expired products.

SUMMARY

According to one example embodiment, a computer-implemented method collaboratively purchasing an item includes receiving, at a collaborative purchasing computing system, a collaborative purchase request from a requester device associated with a requester. The collaborative purchase request includes a plurality of purchase parameters, the plurality of purchase parameters including at least one of a purchase type, a purchase item, a purchase cost and a purchase goal. The method further includes analyzing the collaborative purchase request to identify one or more users associated with the collaborative purchasing computing system that have indicated a desire to participate in a collaborative purchase request having at least one of the same purchase parameters of the plurality of purchase parameters of the received collaborative purchase request. The method also includes transmitting a collaborative purchase offer to the identified users. The collaborative purchase offer comprising one or more of the plurality of purchase parameters. The method further includes receiving one or more collaborative purchase offer acceptances from one or more of the identified users, and providing purchase completion details to the requester device and the one or more identified users that accepted the collaborative purchase offer.

According to another example embodiment, a system for facilitating collaborative purchases includes a collaborative purchasing computing system configured to receive a collaborative purchase request from a requester device associated with a requester. The collaborative purchase request includes a plurality of purchase parameters, the plurality of purchase parameters including at least one of a purchase type, a purchase item, a purchase cost, and a purchase goal. The collaborative purchasing computing system is further configured to analyze the collaborative purchase request to identify one or more users associated with the collaborative purchasing computing system that have indicated a desire to participate in a collaborative purchase request having at least one of the same purchase parameters of the plurality of purchase parameters of the received collaborative purchase request. The collaborative purchasing computing system is further configured to transmit a collaborative purchase offer to the identified users. The collaborative purchase offer comprising one or more of the plurality of purchase parameters. The collaborative purchasing computing system is also configured to receive one or more collaborative purchase offer acceptances from one or more of the identified users, and to purchase completion details to the requester device and the one or more users that accepted the collaborative purchase offer.

According to another example embodiment, a system for facilitating collaborative purchases includes a collaborative purchasing computing system configured to receive a collaborative purchase request from a requester device associated with a requester. The collaborative purchase request includes a plurality of purchase parameters, the plurality of purchase parameters including at least one of a purchase type, a purchase item, a purchase cost, and a purchase goal. The collaborative purchasing computing system is further configured to analyze the collaborative purchase request to identify one or more users associated with the collaborative purchasing computing system that have indicated a desire to participate in a collaborative purchase request having at least one of the same purchase parameters of the plurality of purchase parameters of the received collaborative purchase request. The collaborative purchasing computing system is further configured to transmit a collaborative purchase offer to a user device associated with each of the identified users, the collaborative purchase offer comprising one or more of the purchase parameters. The collaborative purchasing computing system is also configured to receive one or more collaborative purchase offer acceptances from one or more of the identified users, and request payment from the one or more identified users that accepted the collaborative purchase offer. The collaborative purchasing computing system is also configured to receive a payment indication from the one or more identified users that accepted the collaborative purchase offer at the collaborative purchasing computing system. The collaborative purchasing computing system is also configured to inform the requester that the payment indication has been received, and provide purchase completion details to the requester device and the one or more other identified users that accepted the collaborative purchase offer.

These and other features, together with the organization and manner of operation thereof, will become apparent from the following detailed description when taken in conjunction with the accompanying drawings.

BRIEF DESCRIPTION OF THE FIGURES

FIG. 6 is a flow diagram illustrating an example implementation of the method shown in FIG. 4.

DETAILED DESCRIPTION

The sharing economy and other communal services have given rise to a desire for consumers to utilize the ability to connect people with common goals to leverage the purchasing power of multiple consumers to purchase or procure items. For example, groups of consumers with similar goals may be able to collectively bargain to receive a better price on the item by leveraging an economy of scale. Consumers may also be able to communicate and facilitate a collaborative purchase of a bulk good, such as bulk food products. This can allow for the multiple consumers to enjoy the savings associated with bulk purchasing, while simultaneously helping to reduce food waste by effectively distributing the bulk purchase between multiple consumers.

Referring generally to the figures, systems and methods for performing collaborative purchases are shown in various embodiments. According to the various embodiments, a collaborative purchasing computing system can be configured to receive a collaborative purchase request from one or more users specifying one or more items to purchase. The collaborative purchasing computing system can analyze the received collaborative purchase request to determine if other users are interested in purchasing similar items. The collaborative purchasing computing system can further transmit an offer to participate in the collaborative purchase to other users that the collaborative purchasing computing system has determined may be interested. The users receiving the offers can choose to accept or deny the offers. Upon acceptance, the users receive transaction instructions from the collaborative purchasing computing system.

According to various embodiments, as described in further detail below, providing systems and methods for coordinating and facilitating collaborative purchases can provide an improved customer experience for multiple customers. This can not only provide cost savings for individual customers by providing a leveraged buying position, but can also aid in reducing waste. For example, by allowing multiple customers to split a bulk food item purchase, the probability of generating food waste is reduced. Additionally, the systems and methods disclosed herein provide an easy and safe environment for insuring payments are made by each involved customer and that and products are provided to each involved customer. Accordingly, the embodiments described herein solve the technical and internet-centric problem of coordinating and facilitating collaborative purchases between consumers.

Figure 1:
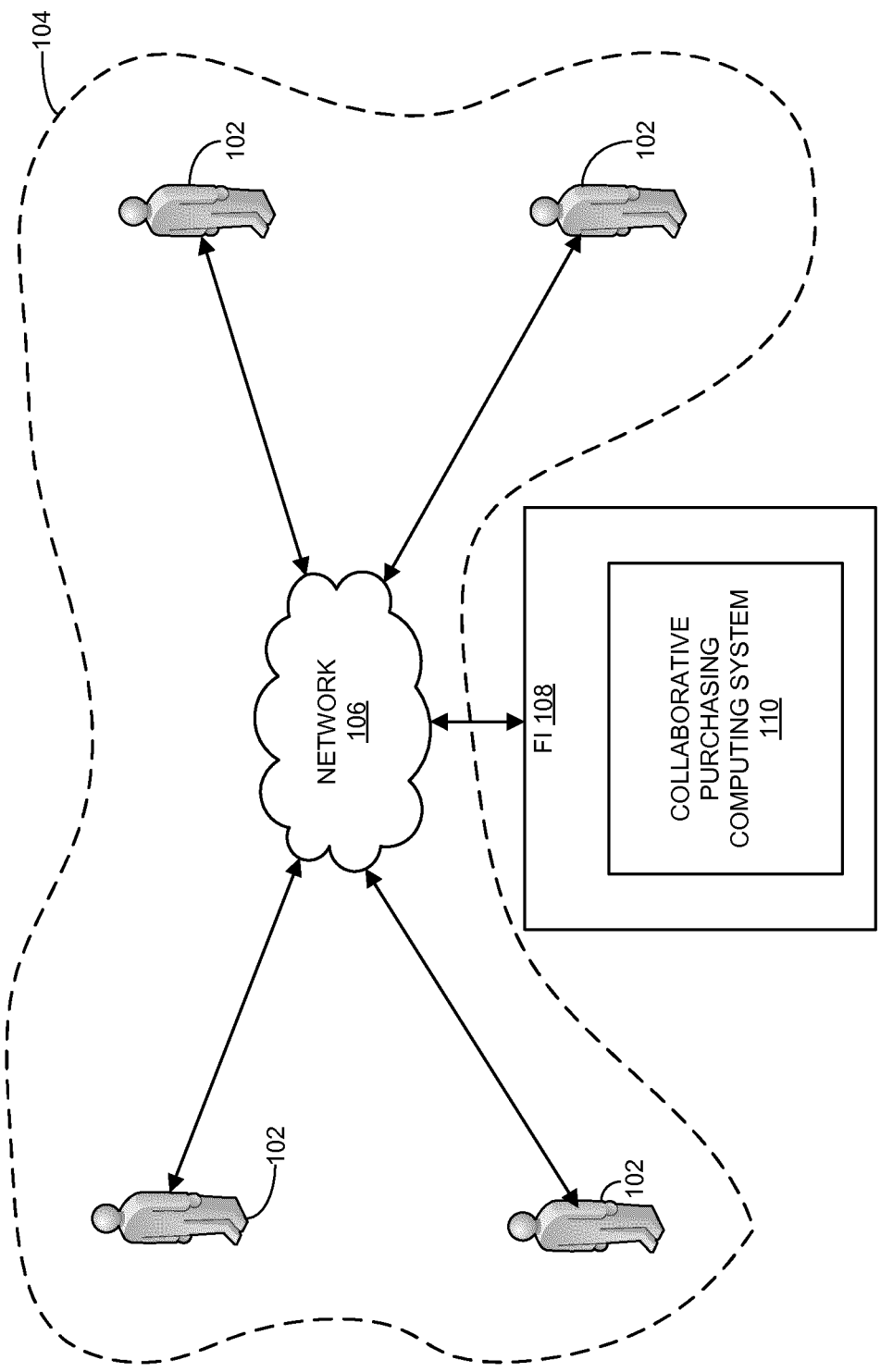
FIG. 1 is a block diagram of a collaborative purchasing network, according to an example embodiment.

FIG. 1 is a block diagram of a collaborative purchasing network 100. The network 100 includes one or more users 102 forming a user pool 104. In one arrangement, the users 102 are individuals. In some arrangements, the users 102 are entities, such as small businesses. Further, the users 102 may be a combination of individuals and/or entities. The collaborative purchasing network 100 is used to connect the users 102 to increase the purchasing power of any one user 102. The users 102 may have similar goals or objectives. For example, the users 102 may want to perform a specific financial transaction, such as purchasing a specific good or service. The collaborative purchasing network 100 can be used to connect the users 102 having similar goals to increase their purchasing power, as will be described in more detail below.

In some arrangements, the users 102 may be represented by virtual agents. For example, the user 102 may interface with one or more virtual agents to facilitate a financial transaction, such as purchasing specific goods or services. Examples of virtual agents can include virtual assistants such as Apple's Siri® or Amazon Alexa®. In some embodiments, the virtual agent may be an autonomous virtual agent. Thus, a user 102 may interface with the collaborative purchasing network directly, or via an agent.

Within the user pool 104, the users 102 may be connected via a network 106. In some arrangements, the network 106 may be an internet-based network. For example, the users 102 may all be in communication with a cloud-based network, as will be described in more detail below. In some arrangements, the network connections between the users 102 are wired network connections, such as a TCP/IP network. In some arrangements, the network connections may be wireless network, such as Wi-Fi, Wi-Max, cellular (3G, 4G, LTE, CDMA), LoRA, ZigBee, Near Field Communication (NFC), Bluetooth, or any other applicable wireless network protocols.

The collaborative purchasing network 100 further includes one or more financial institutions (FI) 108. The FI 108 may be a bank, a credit union, a brokerage house, a currency exchange, a governmental institution, or any other FI. The users 102 may have one or more financial accounts associated with the FI 108. For example, the users 102 may have one or more of a savings account, a checking account, a money market account, a credit card account, or other financial account with the FI 108. The FI 108 includes a collaborative purchasing computing system 110. The collaborative purchasing computing system 110 is configured to facilitate collaboration between the users 102, as will be described in more detail below.

Figure 2:
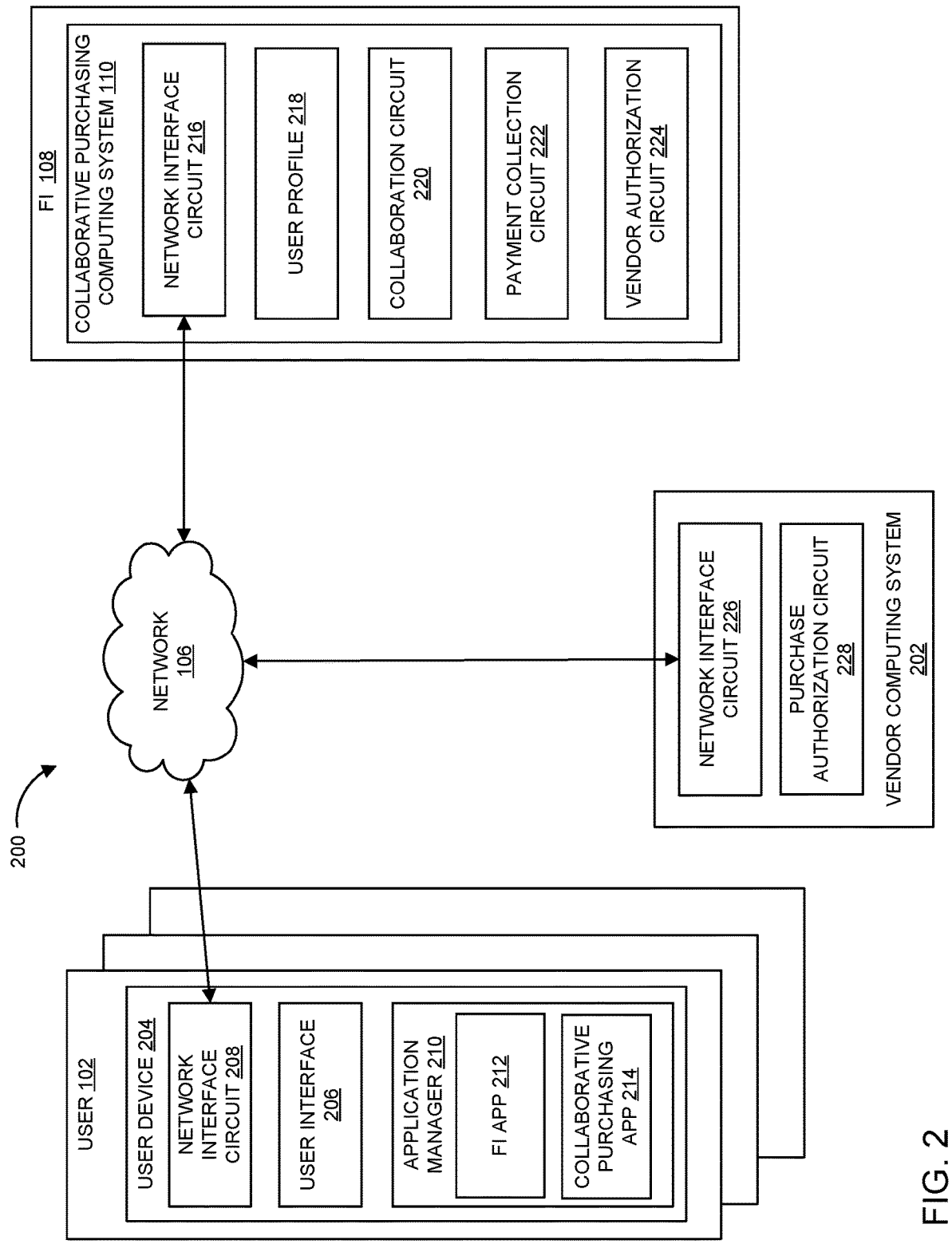
FIG. 2 is a block diagram illustrating a detailed embodiment of the collaborative purchasing network of FIG. 1, according to an example embodiment.

FIG. 2 is a block diagram showing a detailed embodiment of the collaborative purchasing network 100 described above. The collaborative purchasing network 100 includes one or more users 102, a network 106, and an FI 108 as described above. The collaborative purchasing network 100 further includes a vendor computing system 202. The users 102 are each associated with a user device 204. The FI 108, the vendor computing system 202, and the user devices 204 may each include a computer system (e.g. one or more servers, each with one or more processing circuits), each including a processor and a memory.

The processors may be implemented as application specific integrated circuits (ASICs), one or more field programmable gate arrays (PFGAs), a group of processing components, or other suitable electronic processing components. The memory may be one or more devices (e.g., RAM, ROM, Flash memory, hard disk storage) for storing data and/or computer code for completing and/or facilitating the various processes described herein. The memory may be or include non-transient volatile memory, non-volatile memory, and non-transitory computer storage media. The memory may include database components, object code components, script components, or any other type of information structure for supporting the various activities and information structures described herein. The memory may be communicably connected to the processor and include computer code or instructions for executing one or more processes described herein.

The FI 108 and the vendor computing system 202 may include a server-based computing system, for example, comprising one or more networked computer servers that are programmed to perform the operations described herein. For example, the FI 108 may include the collaborative purchasing computing system 110, as described above. The collaborative purchasing computing system 110 and/or the vendor computing system 202 may be implemented as a distributed computer system, where each function is spread over multiple computer systems.

The collaborative purchasing computing system 110 and/or the vendor computing system 202 may be one or more centralized servers connected to one or more of the other listed components within the collaborative purchasing network 100 via the network 106. In some arrangements, the network 106 may be an internet-based network. For example, the components of the collaborative purchasing network 100 may all be in communication with a cloud-based network. In some arrangements, the network connections between the components are wired network connections, such as a TCP/IP network. In some arrangements, the network connections may be wireless network, such as Wi-Fi, Wi-Max, cellular (3G, 4G, LTE, CDMA), LoRA, ZigBee, Near Field Communication (NFC), Bluetooth, or any other applicable wireless network protocols. In some arrangements, the collaborative purchasing computing system 110 and/or the vendor computing system 202 may be hosted by one or more third-parties.

The user device 204 may be any device associated with the user 102 that can communicate with the network 106, the collaborative purchasing computing system 110 and/or the vendor computing system 202. In some arrangements, the user device 204 may be a user interface on an internet accessible website. In some arrangements, the user device 204 is a mobile device associated with the user 102. Example mobile devices can include smartphones (e.g., iPhone®, Android® phones, Windows® phones, etc.), tablet computers (e.g., iPad®, Android® tablet, Microsoft Surface®, laptop computers, wearable device, or any other device capable of communicating with the network 106 and/or the FI 108. In one arrangement, the user device 204 is used to provide access to the collaborative purchasing computing system 110 and/or the vendor computing system 202. For example, the user device 204 may communicate directly with the collaborative purchasing computing system 110 and/or the vendor computing system 202. In some arrangements, the user device 204 may communicate with the collaborative purchasing computing system 110 and/or the vendor computing system 202 via the network 106.

The user device 204 includes a user interface 206, a network interface circuit 208, and an application manager 210. The user interface 206 may be any interface providing inputs to and outputs from the user device 204. For example, the user interface 206 may be a touchscreen display associated with a mobile device, such as a smartphone or tablet PC. In other examples, the user interface 206 may be a combination of a display and a separate input device, such as a keyboard. In still further examples, the user interface 206 may be an audio interface, such as a virtual assistant such as Siri® from Apple®, or other virtual assistants. The network interface circuit 208 facilitates data communications to and from the network 106. The network interface circuit 208 may be configured to communicate wirelessly with the network 106, such as via Wi-Fi, Bluetooth®, NFC, ZigBee, IR, RF, cellular (3G, 4G, LTE, CDMA), etc. In some arrangements, the network interface circuit 208 may communicate with the network 106 via a wired connection, such as via Ethernet, a LAN, a WAN, Firewire, USB, or another applicable wired interface. In some embodiments, data passing through the network interface circuit 208 is encrypted.

The application manager 210 is configured to manage one or more software applications (apps) associated with the user device 204. For example, the application manager 210 may manage an FI app 212 and/or one or more collaborative purchasing apps 214. In one arrangement, the application manager 210 processes requests from the network interface circuit 208 to execute one or more applications. For example, the network interface circuit 208 may receive a request to open the FI app 212 to allow for the FI 108 to interface with the user device 204. Similarly, the network interface circuit 208 may receive a request to open the collaborative purchasing app 214.

The FI app 212 may be a mobile banking application, associated with an FI used by the user 102, such as FI 108. In one embodiment, the FI app 212 allows for direct communication between the user device 204 and the FI 108. In further examples, the FI app 212 may be a mobile wallet application. The collaborative purchasing app 214 may be an application associated with performing one or more collaborative transactions. In one arrangement, the collaborative purchasing app 214 is associated with the FI 108. For example, the collaborative purchasing app 214 may be a specific app available from the FI 108 that allows users 102 associated with the FI 108 to perform collaborative purchases. However, in some examples, the collaborative purchasing app 214 may allow users 102 associated with multiple FIs. For example, in one arrangement, the collaborative purchasing app 214 is a stand-alone application, that can facilitate collaborative purchases between users 102 associated with different FIs. In some arrangements, the collaborative purchasing app 214 is associated with the vendor computing system 202. The collaborative purchasing app 214 may be an app that is provided by a vendor associated with the vendor computing system 202. For example, where the vendor is a retail store, the collaborative purchasing app 214 may allow for collaborative purchases to be made in associated with the retail store. In some embodiments, the FI app 212 and the collaborative purchasing app 214 may be in communication via an application program interface (API).

As described above, the collaborative purchasing computing system 110 is associated with the FI 108. The collaborative purchasing computing system 110 is configured to allow for one or more users 102 to perform collaborative transactions. For example, where a user 102 is interested in buying a new vehicle, the collaborative purchasing computing system 110 may be configured to contact one or more other users 102 with similar interests to allow them to use an economy of scale to leverage a better deal. Similarly, a user 102 may request a collaborative transaction where the user 102 is attempting to purchase one or more bulk items. The user 102 may utilize the collaborative purchasing computing system 110 to find others who are interested in purchasing a portion of the bulk item. These examples will be described in more detail below.

The collaborative purchasing computing system 110 includes a network interface circuit 216, one or more user profiles 218, a collaboration circuit 220, a payment collection circuit 222, and a vendor authorization circuit 224. The network interface circuit 216 facilitates data communications to and from the network 106. The network interface circuit 216 may be configured to communicate wirelessly with the network 112, such as via Wi-Fi, Bluetooth®, NFC, ZigBee®, IR, RF, cellular (3G, 4G, LTE, CDMA), etc. In some arrangements, the network interface circuit 216 may communicate with the network 106 via a wired connection, such as via Ethernet, a LAN, a WAN, Firewire, USB, or another applicable wired interface. In some embodiments, data passing through the network interface circuit 216 is encrypted.

The user profile 218 may contain a number of characteristics and information associated with the one or more users 102. For example, the user profile 218 may include information such as account numbers, account balances, portfolio data, assets, debts, income, etc. In some arrangements, the FI 108 may be the primary FI associated with one or more of the users 102. Where the FI 108 is the primary FI associated with one or more user 102, the FI 108 may have access to a majority of the financial transactions performed by the associated users 102, which may be stored in the user profile 218. The user profile 218 may contain additional information, such as employment information, marital status, address, etc., that is associated with the users 102. The user profile 218 may also include information related to potential collaborative purchases the user 102 may be interested in. For example, the user profile 218 may include goals such as the purchase of a new car. In some examples, the user profile 218 may include a list of stores that sell bulk items (e.g., Sam's Club®, Costco®, Restaurant Depot®) that the user 102 is a member of, and in which they may either want to seek others to share in a purchase, or buy into the purchase of another. The user profile 218 may include certain products that the user 102 is interested in purchasing. For example, the user 102 may indicate that they are interested in certain bulk goods, such as paper products, condiments, canned food products, produce, or other bulk items.

The collaboration circuit 220 is configured to provide collaborative purchase opportunities to one or more user 102. In one arrangement, the collaboration circuit 220 is configured to receive a request from a user 102 to perform a collaborative purchase. As described above, a collaborative purchase may include a request to utilize multiple other users 102 wishing to purchase a similar big ticket items, such as a vehicle or other generally expensive items, and arrange for multiple users 102 to coordinate their purchase to leverage an economy of scale. The collaboration circuit 220 may query one or more databases to determine if additional users 102 are interested in a similar collaborative purchase. For example, the collaboration circuit 220 may query one or more user profiles 218 associated with multiple users 102. As described above, the user profiles 218 may include information related to a user 102, such as desired collaborative purchases. In other arrangements, the collaboration circuit 220 may query one or more additional databases to determine if similar collaborative purchase requests have been made. The collaboration circuit 220 may evaluate data related to other collaborative purchase requests based on multiple parameters. For example, the collaboration circuit 220 may evaluate the other collaborative purchase requests based on geographic location, distance to the user 102 making the collaborative request, type of item, brand of item, memberships at common bulk stores, etc. In some arrangements, the collaboration circuit 220 may have access to a location of a user device 204 associated with a user 102 via the collaborative purchasing app 214. Based on the evaluations, the collaboration circuit 220 can determine one or more users 102 that may be interested in the requested collaborative purchase.

The collaboration circuit 220 may be further configured to communicate with one or more users 102 that the collaboration circuit 220 determines to be potentially interested in participating in the requested collaborative purchase. For example, the collaboration circuit 220 may communicate with one or more users 102 regarding the requested collaborative purchase request based on their geographic location, their previously indicate interest, their previous similar collaborative purchase request, etc. In one arrangement, the collaboration circuit 220 transmits a message to the user devices 204 associated with the users 102. The collaboration circuit 220 may transmit the message to the user devices 204 via the network interface circuit 216. In some arrangements, the message is presented to the user 102 via the collaborative purchasing app 214. The collaboration circuit 220 may transmit the message to one or more specific users 102, or to a larger group of users 102 based on various parameters. For example, if the collaborative purchase request is associated with purchasing a vehicle, the collaboration circuit 220 may direct the messages to other users 102 who have expressed interest in purchasing a similar vehicle. The collaboration circuit 220 may also direct the message to other users 102 who have expressed interest in purchasing a similar vehicle within a geographic range of the requesting user 102. In some examples, the collaboration circuit 220 may transmit a request to all users 102 who have indicated an interest in one or more types of collaborative purchases within a certain area. For example, if the user 102 requesting the collaborative purchase is requesting it for splitting one or more bulk items, the collaboration circuit 220 may transmit the message to other users 102 within a certain distance of the requesting user 102. For example, the collaboration circuit 220 may limit the message to other users 102 within the same store or merchant as the requesting user 102.

In one arrangement, the collaboration circuit 220 is further configured to receive one or more acceptance messages from multiple users 102. For example, a user 102 may accept the request via the collaborative purchasing app 214 on the user device 204. The collaboration circuit 220 may receive the one or more acceptance messages via the network interface circuit 216. The collaboration circuit 220 may be further configured to evaluate the one or more evaluation messages and transmit a message to the requesting user 102 informing them that one or more other users 102 have accepted their collaborative purchase request. The collaboration circuit 220 is further configured to coordinate the collaborative purchase between the users 102 who are a party to the purchase. For example, where the collaborative purchase request was related to the purchase of a vehicle, the collaboration circuit 220 may communicate with the users 102 who are part of the collaborative purchase to coordinate a time to meet at a particular dealership. The collaboration circuit 220 may further allow the users 102 to communicate with each other, such as via the user devices 204. For example, the collaboration circuit 220 may facilitate communicate between the users 102 via the collaborative purchasing app 214. This can allow for the users 102 to communicate with each other without exposing personal information to other users 102. In examples where the collaborative purchase is a request to share in the purchase of a bulk item, the collaboration circuit 220 may arrange for the users 102 to meet at a specific time in a specific location to exchange the goods. In further examples, the collaboration circuit 220 may provide purchase information, such as quantity of good for each user 102, associated cost for each user 102, etc.

The payment collection circuit 222 is configured to receive payments from one or more users 102 who are a party to the collaborative purchase. For example, where the collaborative purchase is associated with the purchase of a bulk item, the collaborative purchasing computing system 110 may require the individual users 102 to pre-emptively pay for their share of the goods. This can protect the requesting user 102 from being responsible with the entire purchase price if one of the other users 102 fails to collect and pay for their portion of the goods. In one arrangement, the users 102 may be able to provide payment via one or more accounts associated with the FI 108. However, other payment methods such as credit cards, debit cards, PayPal®, electronic check, or other payment method are also contemplated. In one example, a user 102 may be able to enter the payment via the collaborative purchasing app 214 on their user device 204.

In one arrangement, the payment collection circuit 222 holds the funds in an escrow account of the FI 108 until the collaborative purchasing computing system 110 verifies that the transaction has been completed. In some arrangements, the payment collection circuit 222 holds the funds in an escrow account and only allows for the purchase to be made once sufficient funds have been received from all of the users 102 party to the collaborative purchase. For example, the payment collection circuit 222 may monitor the locations of the one or more users 102 party to the collaborative purchase. If the users 102 all are within a certain distance of the user 102 purchasing the goods from the merchant, (e.g. the requesting user), the payment collection circuit 222 may determine that the goods have been exchanged, and release the payment to the requesting user 102. In some embodiments, the users 102 may indicate that they have received their goods in the collaborative purchasing app 214. In some embodiments, only after the other users 102 indicate they received their respective goods is the requesting user 102 provided payment.

The vendor authorization circuit 224 is configured to inform a vendor (e.g. a merchant) that the purchase can be completed in some arrangements. For example, the vendor authorization circuit 224 may inform the vendor that the purchase may be completed once the payment collection circuit 222 informs the vendor authorization circuit 224 that all of the payments have been obtained from the users 102. As described above, in some examples the payment for the collaborative purchase may come directly from the FI 108. However, in some examples, the user 102 requesting the purchase may perform the purchase without the vendor authorization circuit 224 being required to authorize the purchase, such as where the funds are taken directly from the account of the user 102.

The vendor computing system 202 is a computing system associated with a vendor which may be involved in a collaborative purchase. However, in some arrangement, the vendor computing system 202 may not be present, such as where the collaborative purchase is associated with an economy of scale purchase, such as multiple users 102 purchasing similar vehicles from the same dealership, as described above. The vendor computing system 202 includes a network interface circuit 226 and a purchase authorization circuit 228. The network interface circuit 226 facilitates data communications to and from the network 106. The network interface circuit 226 may be configured to communicate wirelessly with the network 106, such as via Wi-Fi, Bluetooth, NFC, ZigBee, IR, RF, cellular (3G, 4G, LTE, CDMA), etc. In some arrangements, the network interface circuit 226 may communicate with the network 106 via a wired connection, such as via Ethernet, a LAN, a WAN, Firewire, USB, or another applicable wired interface. In some embodiments, data passing through the network interface circuit 226 is encrypted.

The purchase authorization circuit 228 is configured to authorize a purchase, in some arrangements, upon receiving an authorization message from the FI 108. In one example, the vendor authorization circuit 224 may provide the authorization message to the purchase authorization circuit 228. The purchase authorization circuit 228 may be utilized where the FI 108 is required to authorize a collaborative purchase, such as by not authorizing a purchase until all funds have been obtained from all users 102 that are a party to the collaborative purchase.

Figure 3:
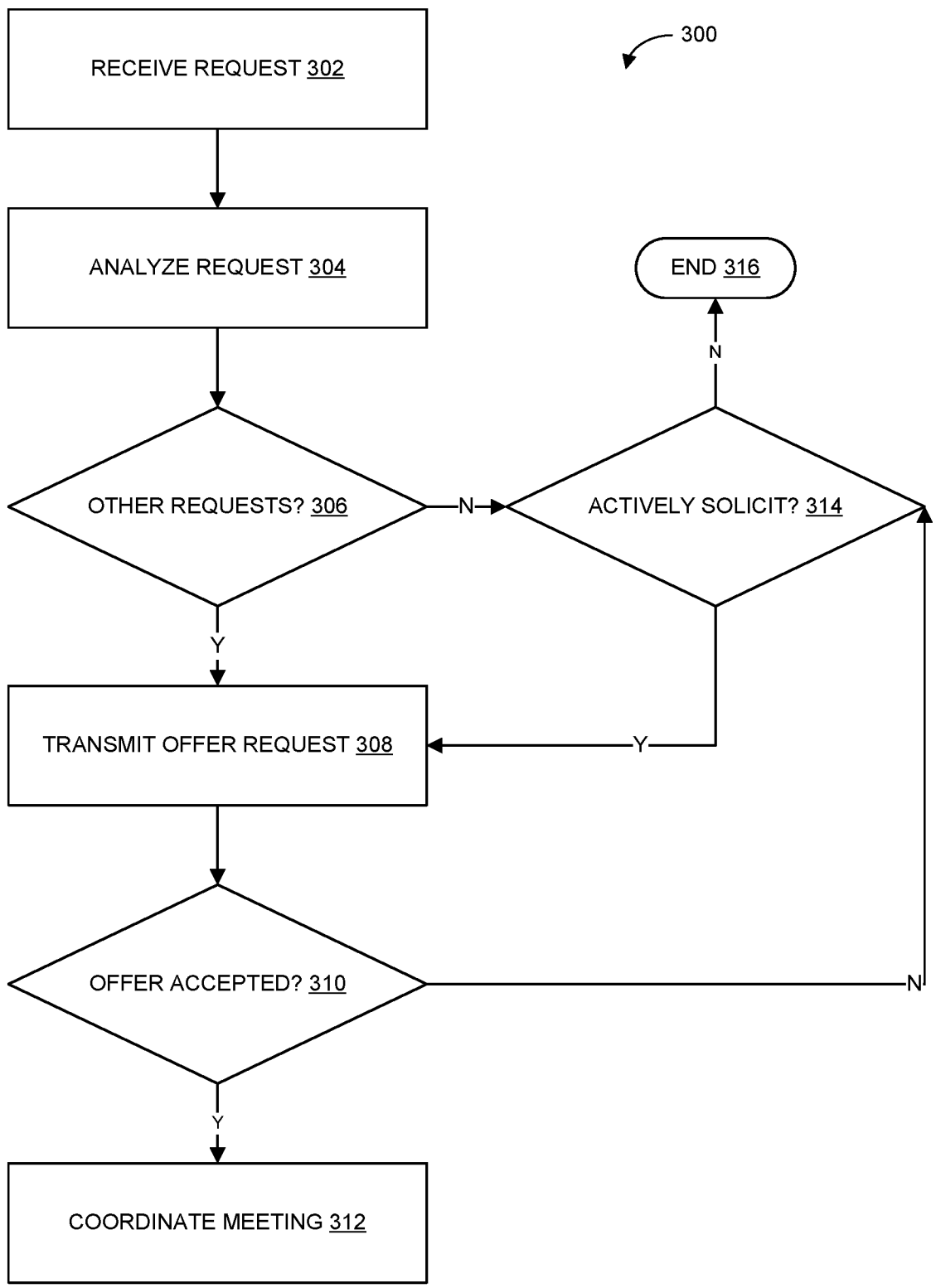
FIG. 3 is a flow diagram of a process for coordinating an economy of scale collaborative purchase, according to an example embodiment.

FIG. 3 is a flow diagram illustrating a process 300 for coordinating an economy of scale collaborative purchase. For clarity and brevity, the process 300 is discussed below in connection with the system 200 described in FIG. 2. Further, it contemplated that the collaborative purchasing computing system 110 performs the process 300 described below, unless otherwise noted. The process 300 receives a request for an economy of scale purchase, and determines if other users 102 have requested a similar economy of scale purchase. The process 300 may actively solicit offers from others if needed. For example, the process 300 may need to actively solicit other offers when the collaborative purchasing computing system 110 determines that not enough users 102 are available to perform an economy of scale purchase. Additionally, the process 300 may transmit offer requests to others who may be interested in the requested economy of scale purchase, and subsequently coordinate a meeting (e.g. schedule a location and time to meet) between all users 102 who accepted the offer.

The collaborative purchasing computing system 110 receives a request for an economy of scale collaborative purchase at 302. An economy of scale collaborative purchase may be understood to be a collaborative purchase that leverages one or more economies of scale to provide more leverage to the users 102. For example, when making large purchases such as appliances, vehicles, motorized equipment, contracted services (e.g. legal services, construction services, accounting services, etc.), if more users 102 are requesting the good or service the more leverage the users 102 have with the vendor of the services. For example, if a group of ten people request vehicles from a particular vendor, they have more purchasing power than if a single user 102 attempted to purchase a vehicle from the vendor. As described above, the collaborative purchasing computing system 110 may receive the request from one or more user devices 204.

The collaborative purchasing computing system 110 analyzes the request at 304. Analyzing the request may include extracting various information from the request, such as the type of purchase requested, an estimated cost of the purchase, a geographic location of the user 102 making the request, a time frame requested by the user 102, etc. Analyzing the request may include determining how many others are requested for the economy of scale purchase. In some examples, the collaborative purchasing computing system 110 may analyze one or more goals in the request to estimate a number of others that would be required to achieve the economy of scale goals set in the request. Analyzing the request may further include comparing the request against other requests made by other users 102. For example, the collaborative purchasing computing system 110 may further analyze other requests relating to the same economy of scale collaborative purchase. In some examples, the collaborative purchasing computing system 110 may analyze similar requests within a certain geographical distance of the requesting user 102. The collaborative purchasing computing system 110 then determine if there are other requests for the requested economy of scale collaborative purchase at 306. In some arrangements, the collaborative purchasing computing system 110 may determine if there are sufficient other requests to achieve the requested economy of scale goals.

If the collaborative purchasing computing system 110 determines that there are other requests, the collaborative purchasing computing system 110 transmits an offer request at 308. The offer request may be transmitted to one or more users 102 via an associated user device 204. The offer request may inform the users 102 that a request for an economy of scale purchase has been generated that may be of interest to them. The offer request may further include offer information, such as the type of purchase associated with the offer request, a geographic location of the requested economy of scale purchase, a cost savings goal, or other information useful to a user 102 attempting to determine if they wish to accept the offer. In some arrangements, the offer request may be an interactive message configured to allow for a user 102 to accept or deny the offer.

The collaborative purchasing computing system 110 then determines if enough offers were accepted to facilitate the economy of scale purchase at 310. As described above, the collaborative purchasing computing system 110 may determine that a certain threshold number of users 102 may be required to achieve a stated economy of scale goal. For example, the collaborative purchasing computing system 110 may determine that five users 102 are required to achieve a stated economy of scale goal. However, the collaborative purchasing computing system 110 may determine that more than five users 102 or less than five users 102 are required to achieve the stated economy of scale goal. In one arrangement, the collaborative purchasing computing system 110 receives the accepted offers via the network interface circuit 216. For example, the users 102 may transmit the acceptance from an associated user device 204.

The collaborative purchasing computing system 110, determining that enough offers have been accepted to achieve the economy of scale goal, coordinates a meeting between the users 102 at 312. In one arrangement, the collaborative purchasing computing system 110 transmits the hours when a vendor is open for business and at which the economy of scale purchases are to take place. The users 102 may then be able to coordinate a meeting time between them. In some arrangements, the collaborative purchasing computing system 110 may request each user 102 to supply the collaborative purchasing computing system 110 with times that each user 102 is available to take possession of a purchased item, within a given time frame. In some arrangements, the collaborative purchasing computing system 110 may have access to a schedule of a user 102. For example, the collaborative purchasing app 214 may have access to a calendar application on the user device 204, such as via an API. Once the collaborative purchasing computing system 110 determines an available time for all users 102, the collaborative purchasing computing system 110 may transmit a time and place information detailing where the users 102 are to meet. In one arrangement, the collaborative purchasing computing system 110 transmits the time and place information to a user device 204 associated with each user 102.

The collaborative purchasing computing system 110, upon determining that an insufficient number of offers were accepted, queries the requesting user 102 to determine if the requesting user 102 would like the collaborative purchasing computing system 110 to actively solicit other users 102 to join the offer at 314. Similarly, if the collaborative purchasing computing system 110 determines that no, or an insufficient number of, other requests had been made that are similar to the economy of scale purchase request, the collaborative purchasing computing system 110 queries the requesting user 102 to determine if the requesting user 102 desires the collaborative purchasing computing system 110 to actively solicit the request to other users 102 at 314. In some arrangements, the collaborative purchasing computing system 110 may transmit the request to one or more other users 102 who have previously expressed an interest in participating in an economy of scale purchase. For example, some users 102 may opt into receiving notifications about potential economy of scale purchases without having any specific goals or objectives listed. Accordingly, if additional users 102 are needed to have enough users 102 to facilitate the purchase, the collaborative purchasing computing system 110 may solicit those users 102 who have opted to receive notifications regarding economy of scale purchases.

Once the collaborative purchasing computing system 110 receives an indication to actively solicit other users 102, the collaborative purchasing computing system 110 transmits offer requests to the other users 102 at 308. In one arrangement, the collaborative purchasing computing system 110 transmits the offer requests as described above. In some arrangements, the collaborative purchasing computing system 110 actively solicits other users 102 by transmitting the offer request to one or more users 102 via their user device 204. In some examples, the collaborative purchasing computing system 110 may transmit the offer request as a push message that is provided to a user 102 via the collaborative purchasing app 214. In some examples, the collaborative purchasing computing system 110 may transmit the offer request as a text message (e.g. SMS, MMS) directly to a user device 204, such as a smart phone. In some examples, the collaborative purchasing computing system 110 may transmit the offer request as a text message or other digital message that can be received by the user device 204. The collaborative purchasing computing system 110 then determines if the offer has been accepted at 310, and repeats the process described above. If the user 102 does not desire to actively solicit other users 102, the process 300 ends at 316.

Figure 4:
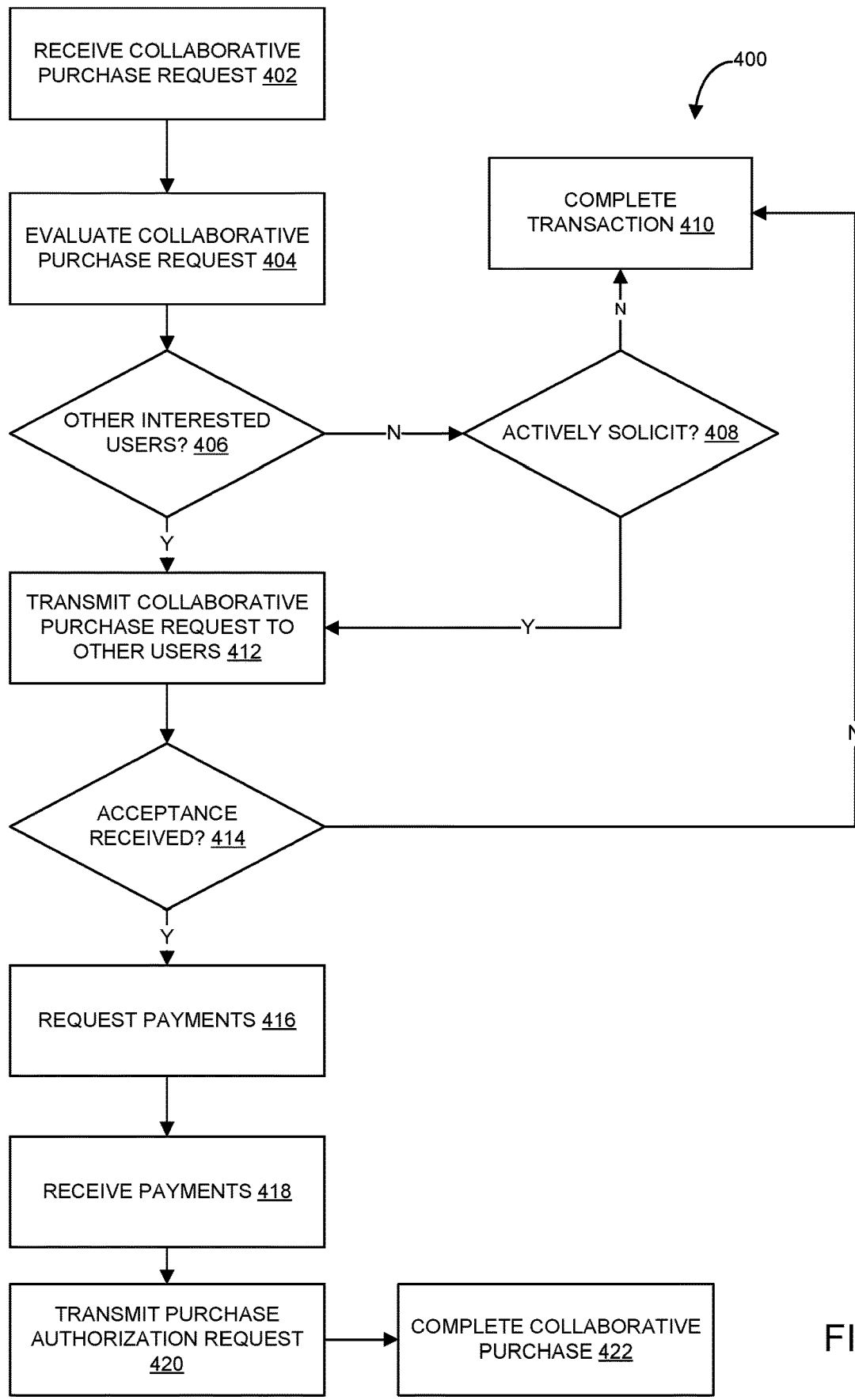
FIG. 4 is a flow diagram illustrating a process for collaboratively purchasing one or more items, according to an example embodiment.

Turning to FIG. 4, a process 400 for collaboratively purchasing one or more items is described, according to some embodiments. For clarity and brevity, the process 400 is discussed below in connection with the system described in FIG. 2. Further, it is contemplated that the collaborative purchasing computing system 110 performs the process 400 described below, unless otherwise noted. The process 400 receives a request for a collaborative purchase, and determines if other users have expressed interest in a collaborative purchase related to the requested collaborative purchase. The process notifies others who may potentially be interested in the collaborative purchase, and allows them to accept an offer to participate in the collaborative purchase. Further, the process 400 requests and receives payment for the goods purchased via the collaborative purchase, and authorizes a vendor to complete the transaction. The collaborative purchase is then completed between the users.

The collaborative purchasing computing system 110 receives a collaborative purchase request at 402. The collaborative purchase request may be a request by a user to have multiple other users contribute to the purchase of one or more items. For example, many consumers shop at bulk stores which sell large quantities of a particular item at discounted prices. However, some individuals do not have a need for the quantity of the item provided, but still want to take advantage of the pricing. Thus, a collaborative purchase request may request one or more other users to share in the item in exchange for splitting the cost. For example, a user may find a deal on a 20 lb bag of peaches at a bulk store. However, the user may not have a need for 20 lbs of peaches. The user can provide a collaborative purchase request to the collaborative purchasing computing system 110 indicating a desire to share in the purchase of the peaches. Accordingly, it should be understood that a collaborative purchase request could be a request to share in the purchase of one or more items that are capable of being divided between more than one user.

In one arrangement, the user may generate the collaborative purchase request via the user device 204. For example, the user may input the desired purchase into the user device 204 via the collaborative purchasing app 214. In one arrangement, the collaborative purchasing app 214 may allow the user to input data related to the desired purchase. In one example, the collaborative purchasing app 214 may allow the user to use a camera or other imaging device on the user device 204 to capture an image of the desired purchase. In further examples, the user can image a bar-code or Quick Response (QR) code on the item to be purchased. The collaborative purchasing app 214 may then extract data about the item via the imaged bar-code or QR code and place the extracted data into the collaborative purchase request. In some arrangements, the user 102 may provide instructions to an agent of the user 102 (e.g. Siri®, Alexa®) to initiate the collaborative purchase request. For example, the user 102 may instruct the agent to purchase a portion of a bulk item. The agent may then provide the request to the collaborative purchasing computing system 110, which can then process the request as described herein. In some arrangements, the agent may have access to the user profile 218 of the user 102, and can instruct the collaborative purchasing computing system 110 to use known merchants listed in the user profile 218 to facilitate the purchase. As described above, the collaborative purchasing computing system 110 may receive the request from one or more user devices 204 and/or an agent of the user 102. In some examples, the agent of the user 102 may be integrated into the user device 204 associated with the user 102.

The collaborative purchasing computing system 110 evaluates the collaborative purchase request at 404. In one arrangement, the collaborative purchasing computing system 110 evaluates the collaborative purchase request to extract information related to the collaborative purchase request. For example, the collaborative purchasing computing system 110 may extract information such as requested items to be purchased, cost of the item, quantity of the item, etc. The collaborative purchasing computing system 110 may extract further information, such as what store or vendor the request was made from, the geographic location of the store or vendor, what type of payments the store or vendor accepts, etc.

Once the collaborative purchase request is extracted, the collaborative purchasing computing system 110 determines if there are any potentially interested users at 406. For example, the collaborative purchasing computing system 110 may locate one or more other users who may be within the same store or vendor at which the request was made. In some examples, the collaborative purchasing computing system 110 may review one or more user profiles 218 to determine if other users have expressed an interest in the item or items associated with the collaborative purchase request. The collaborative purchasing computing system 110 may also evaluate other users who are interested in collaborative purchases that are within a certain geographical distance of the vendor or store associated with the item or items associated with the collaborative purchase request.

If the collaborative purchasing computing system 110 does not determine other interested users, the collaborative purchasing computing system 110 can determine if other users should be actively solicited at 408. In one arrangement, the collaborative purchasing computing system 110 may ask the requesting user if they should actively solicit one or more other users to participate in the requested collaborative purchase. In some arrangements, the collaborative purchasing computing system 110 may determine that others should be actively solicited based on a setting provided by the user within the collaborative purchasing app 214 requesting for active solicitation to be provided when the collaborative purchasing computing system 110 cannot determine interested users. In one example, actively soliciting users may include soliciting various users who may participate in the collaborative purchase. For example, if there are other users who have previously utilized collaborative purchases who are located in the same store of the vendor as the requesting user, the collaborative purchasing computing system 110 may actively solicit those users. Similarly, the collaborative purchasing computing system 110 may actively solicit users within a certain geographical distance of the store or vendor as the requesting user. In some arrangements, the collaborative purchasing computing system 110 may solicit any user within a certain geographical distance that have indicated that they wish to receive solicitations. If the requesting user does not wish to actively solicit others, the requesting user can complete the transaction at 410. Completing the transaction can include purchasing the entire items personally, or by simply not purchasing the items.

If the collaborative purchasing computing system 110 determines there are other interested users, or that the collaborative purchasing computing system 110 should actively solicit others, the collaborative purchase request is transmitted to one or more other users at 412. The collaborative purchase request may be formatted by the collaborative purchasing computing system 110 to provide data related to the requested collaborative purchase directly to the one or more other users. For example, the collaborative purchase request may include the item to be purchased, the quantity of the item to be purchased, the price of the item (e.g. price per unit, total price), a timeline for the purchase to take place, the store or vendor from which the item will be purchased, etc. In one arrangement, the purchase request may include one or more conditions provided by the requesting user. The conditions may include a meeting place, and a time-frame for completing the collaborative purchase. In some arrangements, the collaborative purchase request may be an interactive message, allowing for a user to accept or deny the offer. Further, the collaborative purchase request may allow the user to indicate what quantity of the item they would be interested in purchasing.

In one arrangement, the collaborative purchasing computing system 110 transmits the collaborative purchase request to other users via their user devices 204. In some examples, the collaborative purchasing computing system 110 may transmit the collaborative purchase request as a push message that is provided to a user via the collaborative purchasing app 214. In some examples, the collaborative purchasing computing system 110 may transmit the offer request as a text message (e.g. SMS, MMS) directly to one or more user devices 204, such as a smart phone associated with the other users. In other examples, the collaborative purchasing computing system 110 may transmit the collaborative purchase as a digital message that can be received by the user device 204. The collaborative purchasing computing system 110 determines if the offer has been accepted at 414. As described above, the users may be able to accept the collaborative purchase request by replying to a digital message transmitted by the collaborative purchasing computing system 110. In some examples, the users may be able to accept the collaborative purchase request using an interface within the collaborative purchasing app 214. In some arrangements, the user may be able to accept the collaborative purchase request in general, or may be able to provide a customized acceptance. For example, a user may choose to agree to purchase only a certain quantity of the item.

The collaborative purchasing computing system 110 determines that one or more acceptances have been received at 414. In some examples, the collaborative purchasing computing system 110 may determine if enough other users have agreed to accept the collaborative purchase request. In some examples, the requesting user may place a minimum or maximum requirement on the number of other users involved in the collaborative purchase. In some examples, the requesting user may place a requirement on the quantity of the item that others are required to purchase if they are to participate in the transaction. Thus, at 414 the collaborative purchasing computing system 110 determines both if acceptances have been received, and if sufficient acceptances have been received to satisfy any requirements provided by the requesting user. If an insufficient number of acceptances have been received, the transaction may be completed at 410, as described above.

Upon determining that a sufficient number of acceptance have been received, the collaborative purchasing computing system 110 may request payments from the other users who accepted the collaborative purchase request at 416. In some examples, payment is only required from the other users where the collaborative purchase request indicates that the requesting user will provide the initial payment for the item, and will then receive payment for the quantities of items to be purchased by others. In some examples, payment is required from all users who are a party to the collaborative purchase. The payment requests 416 may be provided to the users via the collaborative purchasing app 122 on their respective user devices 204. In some arrangements, the collaborative purchasing app 214 may access the FI app 212 to allow a user to provide the payment via the collaborative purchasing app 122. For example, the collaborative purchasing app 214 may access the FI app 212 via an API. In some arrangements, the users may be able to provide payment directly from the FI app 212. In some arrangements, the users may provide payment via other methods, such as electronic checks, online payment sites (e.g. PayPal®, Amazon Pay®), or payment transfer via a website associated with the FI 108. In one arrangement, the payment request may be sent via a digital message such as an e-mail, text message (e.g. SMS, MMS), push notification, or other digital message. In some arrangements, the payment request may be sent as a digital message within the collaborative purchasing app 214.

The collaborative purchasing computing system 110 receives the payment(s) at 418. As described above, the users may provide the payment to the collaborative purchasing computing system 110 using various techniques. Once the required payments have been received, the collaborative purchasing computing system 110 transmits a purchase authorization request at 420. In some arrangements, the purchase authorization request is transmitted to the requesting user, informing the requesting user that all payments have been provided, and that they can proceed with the transaction. In some arrangements, the FI 108 and, by extension, the collaborative purchasing computing system 110, may provide the payment for the item directly to the vendor or store. In that instance, the collaborative purchasing computing system 110 can transmit the purchase authorization request 420 directly to the store or vendor.

The collaborative purchase may then be completed at 422. In one embodiment, the collaborative purchase is completed when the item is divided among the parties to the collaborative purchase. In some examples, the collaborative purchasing computing system 110 may receive an indication from each user that is a party to the collaborative purchase that they have received their portion of the item. Once all users have received their portion of the item, the received payments are provided to the requesting user. For example, the received payments may be transferred to an account of the FI 108 associated with the requesting user. In some arrangements, the collaborative purchasing computing system 110 may determine that the collaborative purchase has been completed when all users party to the collaborative purchase are determined to be within a certain geographical range of a pre-determined meeting place, and within a pre-determined time window. In some arrangements, the collaborative purchase is determined to be completed after a certain time period has expired. For example, where the requesting user has specified a specific meeting place and time-frame, any user party to the collaborative purchase who has failed to arrive and collect their portion of the item may be determined to be in default, and their previously received payments transferred to the requesting user.

Figure 5:
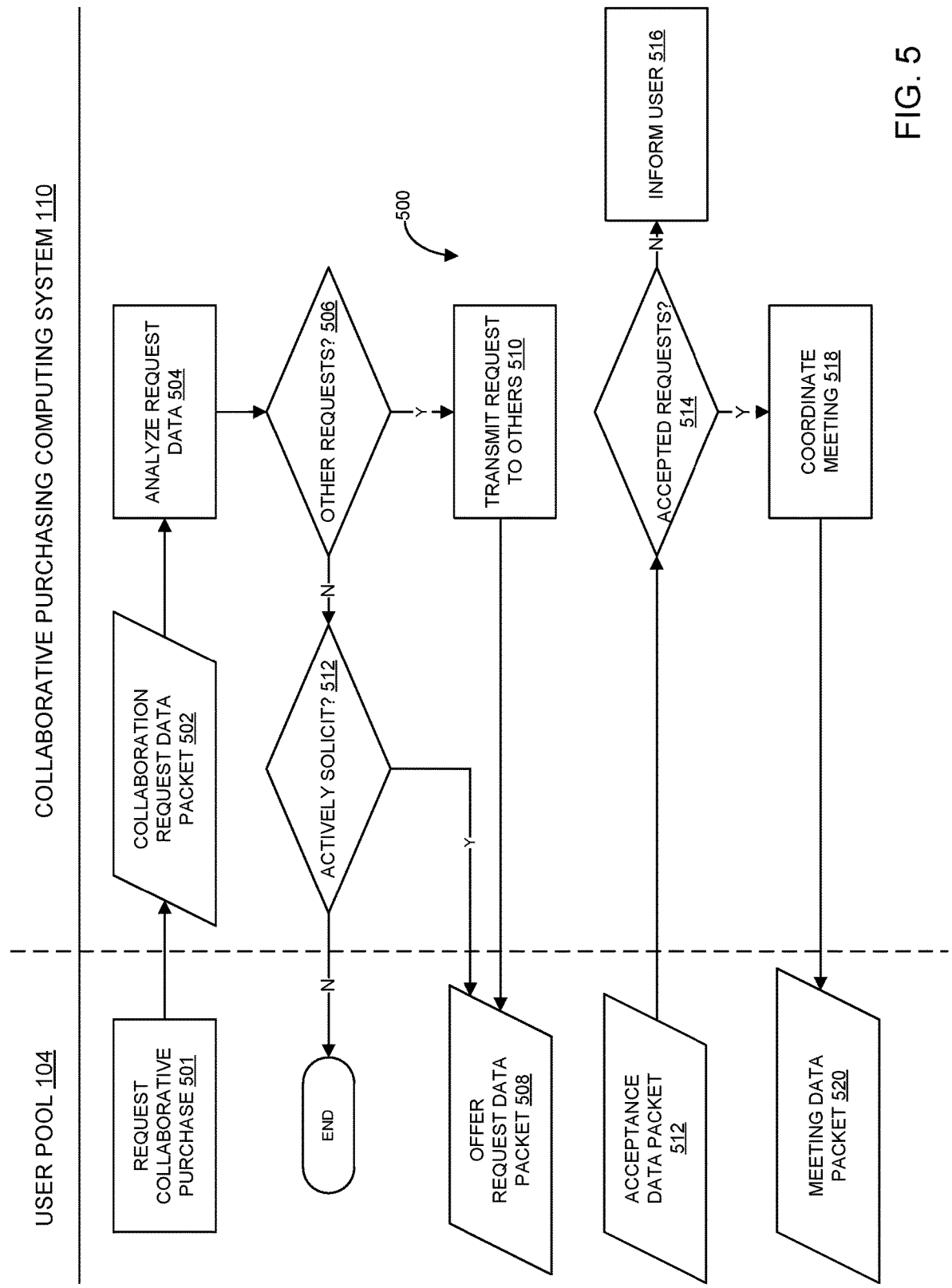
FIG. 5 is a flow diagram illustrating an example implementation of the method shown in FIG. 3.

FIG. 5 is a flow diagram illustrating an example implementation 500 of the process 300 shown in FIG. 3. A request for an economy of scale collaborative purchase is requested at 501 from a user within the user pool 104. The economy of scale collaborative purchase is described above. A collaboration request data packet 502 is then sent to the collaborative purchasing computing system 110. The collaboration request data packet 502 may include information such as the type of purchase requested, an estimated cost of the purchase, a geographic location of the user making the request, a time frame requested by the user, or other information associated with the requested economy of scale collaborative purchase. The collaborative purchasing computing system 110 analyzes the collaboration request data packet 502 at 504 and extracts the information within the collaboration request data packet 502.

The collaborative purchasing computing system 110 then determines if there are other similar requests for an economy of scale collaborative purchase at 506. For example, the collaborative purchasing computing system 110 determines if there have been other users who may have previously requested an economy of scale purchase having similar characteristics as the requested economy of scale collaborative purchase (e.g., same type of item to be purchased). If other users have previously requested a similar economy of scale purchase, the collaborative purchasing computing system 110 transmits an offer request data packet 508 at 510. The collaborative purchasing computing system 110 then determines if one or more acceptance data packets 512 have been received from one or more users within the user pool 104 at 514. The acceptance data packets 512 may include an indication that a user has accepted the economy of scale purchase request. In some examples, the acceptance data packets 512 may include additional information, such as user information, user availability, user location, etc. In one arrangement, the collaborative purchasing system 110 may determine if a sufficient number of acceptance data packets 512 were received to successfully complete the requested economy of scale purchase.

If the collaborative purchasing computing system 110 determines that an insufficient number of acceptance data packets 512 were received, the collaborative purchasing computing system 110 may inform the requesting user that there was not sufficient acceptance to complete their economy of scale purchase goals at 516. If the collaborative purchasing computing system 110 determines that a sufficient number of acceptance data packets 512 were received, the collaborative purchasing computing system 110 coordinates a meeting for the users to perform the economy of scale purchase at 518. The collaborative purchasing computing system 110 then transmits a meeting data packet 520 to the users who are a party to the economy of scale purchase to allow them to complete the purchase. The meeting data packet 520 may include information relating to date, time, and location that the economy of scale purchase is to take place. The meeting data packet 520 may also include information such as user contact info, stated goals, etc.

If the collaborative purchasing computing system 110 determines that there were no sufficient other requests at 506, the collaborative purchasing computing system 110 may determine if an active solicitation of users should be performed at 522. If an active solicitation is not appropriate or permitted by the requesting user, the process ends at 524. If the active solicitation is appropriate and permitted by the user, one or more offer request data packets 508 are transmitted to users within the user pool 104, and the process continues as described above.

FIG. 6 is a flow diagram illustrating an example implementation 600 of the process 400 shown in FIG. 4. A collaborative purchase request data packet 602 is transmitted at 604 from a user in the user pool 104 to the collaborative purchasing computing system 110. The collaborative purchase request data packet 602 may include information related to the desired collaborative purchase. For example, the collaborative purchase request data packet 602 may include a request for one or more other users from the user pool to share in the purchase of an item in exchange for splitting the cost. Thus, the collaborative purchase request data packet 602 may include information related to the type of item being purchased, a quantity of the item, a cost of the item, a location at which the item is going to be purchased, a store or vendor from which the item will be purchased, an expected time and date of the purchase, etc. The collaborative purchasing computing system 110 analyzes the collaborative purchase request data packet 602 at 606 to extract the information within the collaborative purchase request data packet 602.

The collaborative purchasing computing system 110 then transmits a collaborative purchase offer data packet 608 at 610. The collaborative purchasing computing system 110 may transmit the collaborative purchase offer data packet 608 to one or more users via their user device 204. The collaborative purchase offer data packet 608 may include information relating to the requested collaborative purchase. For example, the collaborative purchase offer data packet 608 may include information from the collaborative purchase request data packet 602 described above. The collaborative purchase offer data packet 608 may further include data such as time for acceptance, estimated payment, expected quantity of item, etc. One or more users within the user pool 104 may then provide a collaborative purchase acceptance data packet 612 to the collaborative purchasing computing system 110. The collaborative purchasing computing system 110 then determines if a sufficient number of acceptances were received at 614. For example, where the requesting user wants to split the item between a certain number of users, the collaborative purchasing computing system 110 determines when sufficient users have accepted the collaborative purchase request. In some examples, only a single acceptance may be required. If the collaborative purchasing computing system 110 determines that insufficient acceptances were received, the user may complete the purchase at 618. Completing the purchase may include the user purchasing the item, or deciding to not purchase the item.

If the collaborative purchasing computing system 110 determines that sufficient acceptances have been received, the collaborative purchasing computing system requests payment from each user who provided an acceptance at 616. The users provide the payment at 620, and the collaborative purchasing computing system 110 receives the payments at 622. When the collaborative purchasing computing system 110 receives all of the payments, the collaborative purchasing computing system 110 provides a purchase authorization data packet 624 to the vendor computing system 202 at 624. In some arrangements, the purchase authorization data packet 624 may be provided to the requesting user as well. The purchase authorization data packet 624 may include an indication that sufficient funds have been collected to allow the purchase to be completed. The collaborative purchase can then be competed as described above.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more dedicated processors may be structured to perform or otherwise execute certain operations independent of one or more co-processors. In some example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method for conducting a collaborative purchase, the method comprising:
   receiving, at a collaborative purchasing computing system via a network associated with a financial institution, a collaborative purchase request from a virtual assistant associated with a requester, the collaborative purchase request including a plurality of purchase parameters, the plurality of purchase parameters including an economy of scale purchase type and at least one of a purchase item, a purchase cost, and a purchase goal, wherein the requester is associated with a payment account of the financial institution;
   analyzing the collaborative purchase request to identify at least one user associated with the collaborative purchasing computing system of the financial institution based on an indication of a desire to participate in a collaborative purchase having the economy of scale purchase type and additional purchase parameters of the plurality of purchase parameters of the received collaborative purchase request and based on a geographic location of a user device of the at least one user being within a geographic range of the virtual assistant, wherein analyzing the collaborative purchase request to identify the at least one user further includes querying one or more databases comprising data associated with the at least one user for other collaborative purchase requests within the geographic range associated with the economy of scale purchase type;
   transmitting, via the network, a collaborative purchase offer to the at least one user, the collaborative purchase offer comprising the plurality of purchase parameters;
   receiving, via the network, a collaborative purchase offer acceptance from the at least one user, wherein the collaborative purchase offer acceptance comprises the additional purchase parameters;
   in response to a determination that the collaborative purchase offer acceptance and the purchase parameters provided by the virtual assistant and the additional purchase parameters have been satisfied, accessing, via an application programming interface (API), schedule information from the user device of the at least one user, wherein the schedule information includes available times for the requester and the at least one user to meet, and wherein satisfying the purchase parameters and the additional purchase parameters comprises determining that a threshold number of users of the at least one user was met to complete the economy of scale purchase type;
   accessing, via the API, a financial institution application on the user device of the at least one user to hold funds in an escrow account of the financial institution;
   in response to accessing the financial institution application on the user device of the at least one user to hold funds in the escrow account, transmitting, via the network, a payment from the payment account of the requester and a purchase authorization data packet to a vendor computing system of a vendor of the economy of scale purchase type;
   providing, via the network, in response to identifying a meeting time from the available times and identifying a meeting location that the requester and the at least one user can meet at during the meeting time based on location data, purchase completion details to the virtual assistant and the at least one user that accepted the collaborative purchase offer, wherein the purchase completion details comprise the meeting time and the meeting location; and
   in response to determining each of the at least one user received the at least one purchase item based on each of the at least one user being within a geographic range of the meeting location, releasing the funds in the escrow account to the payment account of the requester.

2. The method of claim 1, further comprising:
  requesting a payment from the at least one user that accepted the collaborative purchase offer;
  receiving a payment indication from the at least one user that accepted the collaborative purchase offer at the collaborative purchasing computing system; and
  informing the requester that the payment indication has been received.

3. The method of claim 2, wherein the payment indication indicates that the payment has been initiated by the at least one user that accepted the collaborative purchase offer.

4. The method of claim 1, wherein the purchase goal of the economy of scale purchase type is a desired cost saving on one or more items to be purchased by each of the requester and the at least one user using economies of scale to obtain a group purchase discount.

5. The method of claim 1, wherein the economy of scale purchase type is a purchase of a bulk item, wherein the purchase goal of the purchase of the bulk item is a division of the bulk item among the at least one user that accepted the collaborative purchase offer to achieve a desired cost distribution among the requester and the at least one user that accepted the collaborative purchase offer.

6. The method of claim 1, further comprising transmitting the collaborative purchase offer to at least one potential user based on the collaborative purchasing computing system identifying the at leas tone potential user that previously indicated a desire to participate in a collaborative purchase having at least one of the same purchase parameters of the plurality of purchase parameters of the received collaborative purchase request.

7. The method of claim 6, wherein the at least one potential user has previously indicated a desire to receive collaborative purchase offers.

8. A system for facilitating a collaborative purchase, the system comprising:
  a collaborative purchasing computing system communicatively coupled to a communication network associated with a financial institution, the collaborative purchasing computing system further configured to:
    receive, via the communication network, a collaborative purchase request from a virtual assistant associated with a requester, the collaborative purchase request including a plurality of purchase parameters, the plurality of purchase parameters including an economy of scale purchase type and at least one of a purchase item, a purchase cost, and a purchase goal, wherein the requester is associated with a payment account of the financial institution;
    analyze the collaborative purchase request to identify at least one user associated with the collaborative purchasing computing system of the financial institution based on an indication of a desire to participate in a collaborative purchase having the economy of scale purchase type and additional purchase parameters of the plurality of purchase parameters of the received collaborative purchase request and based on a geographic location of a user device of the at least one user being within a geographic range of the virtual assistant, wherein analyzing the collaborative purchase request to identify the at least one user further includes querying one or more databases comprising data associated with the at least one user for other collaborative purchase requests within the geographic range associated with the economy of scale purchase type;
    transmit, via the communication network, a collaborative purchase offer to the at least one user, the collaborative purchase offer comprising the plurality of purchase parameters;
    receive, via the communication network, a collaborative purchase offer acceptance from the at least one user, wherein the collaborative purchase offer acceptance comprises the additional purchase parameters;
    in response to a determination that the collaborative purchase offer acceptance and the purchase parameters provided by the virtual assistant and the additional purchase parameters have been satisfied, access, via an application programming interface (API), schedule information from the virtual assistant and from the user device, wherein the schedule information includes available times for the requester and the at least one user to meet, and wherein satisfying the purchase parameters and the additional purchase parameters comprises determining that a threshold number of users of the at least one user was met to complete the economy of scale purchase type;
    access, via the API, a financial institution application on the user device of the at least one user to hold funds in an escrow account of the financial institution;
    in response to accessing the financial institution application on the user device of the at least one user to hold funds in the escrow account, transmit, via the communication network, a payment from the payment account of the requester and a purchase authorization data packet to a vendor computing system of a vendor of the economy of scale purchase type;
    provide, via the communication network, in response to identifying a meeting time from the available times and identifying a meeting location that the requester and the at least one user can meet at during the meeting time based on location data, purchase completion details to the virtual assistant and the at least one user that accepted the collaborative purchase offer, wherein the purchase completion details comprise the meeting time and the meeting location; and
    in response to determining each of the at least one user received the at leas tone purchase item based on each of the at least one user being within a geographic range of the meeting location, release the funds in the escrow account to the payment account of the requester.

9. The system of claim 8, wherein the collaborative purchasing computing system is further configured to:
  request payment from the at least one user that accepted the collaborative purchase offer;
  receive a payment indication from the at least one user that accepted the collaborative purchase offer at the collaborative purchasing computing system; and
  inform the requester that the payment indication has been received.

10. The system of claim 9, wherein the payment indication indicates that the payment has been initiated by the at least one user that accepted the collaborative purchase offer.

11. The system of claim 8, wherein the purchase goal of the economy of scale purchase type is a desired cost saving on one or more items to be purchased by each of the requester and the at least one user using economies of scale to obtain a group purchase discount.

12. The system of claim 8, wherein the economy of scale purchase type is a purchase of a bulk item, wherein the purchase goal of the purchase of the bulk item is a division of the bulk item among the at least one user that accepted the collaborative purchase offer to achieve a desired cost distribution among the requester and the at least one user that accepted the collaborative purchase offer.

13. One or more non-transitory computer-readable storage media having instructions stored thereon that, when executed by at least one processing circuit, cause the at least one processing circuit to:
 receive, via a communication network, a collaborative purchase request from a virtual assistant associated with a requester, the collaborative purchase request including a plurality of purchase parameters, the plurality of purchase parameters including an economy of scale purchase type and at least one of a purchase item, a purchase cost, and a purchase goal, wherein the requester is associated with a payment account of a financial institution;
 analyze the collaborative purchase request to identify at least one user associated with a collaborative purchasing computing system of the financial institution based on an indication of a desire to participate in a collaborative purchase having the economy of scale purchase type and additional purchase parameters of the plurality of purchase parameters of the received collaborative purchase request and based on a geographic location of a user device of the at least one user being within a geographic range of the virtual assistant, wherein analyzing the collaborative purchase request to identify the at least one user further includes querying one or more databases comprising data associated with the at least one user for other collaborative purchase requests within the geographic range associated with the economy of scale purchase type;
 transmit, via the communication network, a collaborative purchase offer to the user device of each of the at least one user, the collaborative purchase offer comprising the plurality of purchase parameters;
 receive, via the communication network, a collaborative purchase offer acceptance from the at least one user, wherein the collaborative purchase offer acceptance comprises the additional purchase parameters;
 in response to a determination that the collaborative purchase offer acceptance and the purchase parameters provided by the virtual assistant and the additional purchase parameters have been satisfied, access, via an application programming interface (API), schedule information from the virtual assistant and from the user device, wherein the schedule information includes available times for the requester and the at least one user to meet, and wherein satisfying the purchase parameters and the additional purchase parameters comprises determining that a threshold number of users of the at least one user was met to complete the economy of scale purchase type;
 access, via the API, a financial institution application on the user device of the at least one user to hold funds in an escrow account of the financial institution;
 in response to accessing the financial institution application on the user device of the at least one user to hold funds in the escrow account, transmit, via the communication network, a payment from the payment account of the requester and a purchase authorization data packet to a vendor computing system of a vendor;
 provide, via the communication network, in response to identifying a meeting time from the available times and identifying a meeting location that the requester and the at least one user can meet at during the meeting time based on location data, purchase completion details to the virtual assistant and the user device of the at least one user that accepted the collaborative purchase offer, wherein the purchase completion details comprise the meeting time and the meeting location; and
 in response to determining each of the at leas tone user received the at leas tone purchase item based on each of the at least one user being within a geographic range of the meeting location, release the funds in the escrow account to the payment account of the requester.

14. The one or more non-transitory computer-readable storage media of claim 13, wherein the instructions further cause the at least one processing circuit to:
 request payment from the at least one user that accepted the collaborative purchase offer;
 receive a payment indication from the at least one user that accepted the collaborative purchase offer; and
 inform the requester that the payment indication has been received.

15. The one or more non-transitory computer-readable storage media of claim 14, wherein the payment indication indicates that the payment has been initiated by the at least one user that accepted the collaborative purchase offer.

16. The one or more non-transitory computer-readable storage media of claim 13, wherein the purchase goal of the economy of scale purchase type is a desired cost saving on one or more items to be purchased by each of the requester and the at least one user using economies of scale to obtain a group purchase discount.

17. The one or more non-transitory computer-readable storage media of claim 13, wherein the economy of scale purchase type is a purchase of a bulk item, wherein the purchase go al of the purchase of the bulk item is a division of the bulk item among the at least one user that accepted the collaborative purchase offer to achieve a desired cost distribution among the requester and the at least one user that accepted the collaborative purchase offer.

* * * * *